UNITED STATES PATENT OFFICE.

ANSEL C. DENNING, OF JOHNSON CITY, NEW YORK.

SUBSTITUTE MATERIAL FOR MAKING BOX-TOES FOR SHOES.

15,235. Specification of Reissued Letters Patent. Reissued Nov. 29, 1921.

No Drawing. Original No. 1,303,262, dated May 13, 1919, Serial No. 253,900, filed September 13, 1918. Application for reissue filed March 9, 1920. Serial No. 364,517.

*To all whom it may concern:*

Be it known that I, ANSEL C. DENNING, citizen of the United States, residing at Johnson City, in the county of Broome and State of New York, have invented certain new and useful Improvements in Substitute Material for Making Box-Toes for Shoes, of which the following is a specification.

In shoe manufacture the material generally employed in forming and maintaining the shape of box toes is wool felt. This material possesses very desirable qualities for that purpose and for that reason has heretofore been almost exclusively employed in the making of box toes for shoes. However, on account of the difficulty, at times, in obtaining an adequate supply of wool felt for use in shoe manufacture and also on account of the high cost thereof it has been the aim of shoe manufacturers to obtain a substitute material available for the same purposes as the wool felt and susceptible of being employed in the same or substantially the same manner in the process of manufacturing boots and shoes.

It has been found very difficult to provide a substitute for wool felt having the characteristics of that material and capable of being used to the same advantage and in the same manner in the making of box toes. However, as the result of a knowledge of the requirements of materials used in the manufacture of boots and shoes and the behavior thereof when subjected to the different processes involved I have been able to successfully develop a substitute material for wool felt which entirely meets the requirements of box toe manufacture. The new substitute material consists primarily of cotton fabric rags and tannery hair, preferably in the proportion of 70% cotton rags and 30% tannery hair. These materials are worked up into a stock which is placed in a beater or beating engine such as employed in pulp making, and after being properly worked up in the beater are run onto a cylinder wet machine, producing in sheet form the new felted material. In the process of making up the box toes there is incorporated with the new felted material, consisting of the rags and tannery hair, a thermoplastic binder such as rosin, thereby imparting to the material the thermoplastic characteristic so that the material may be readily softened with heat and molded and then allowed to cool with the result of hardening and retaining the molded shape, making a hard box toe of the same character as a box toe made from wool felt, and in fact having superior advantages thereover from the standpoint of economy and durability.

I claim:—

1. The felted material for making box shoe toes composed solely of cotton fabric rags, tannery hair and a thermoplastic binder.

2. A felted material for making box shoe toes composed solely of cotton woven-fabric rags, tannery hair and a thermoplastic binder.

3. A felted material for making box-toes of shoes composed solely of textile rags, tannery hair, and a thermoplastic binder, the proportion of tannery hair being substantially less than the proportion of textile rags.

4. A felted material for making box-toes of shoes, comprising a sheet formed solely from a beaten pulp of textile rags to which has been added tannery hair, said sheet being impregnated with a thermoplastic binder, and the proportion of tannery hair in the sheet being substantially less than the proportion of textile rags.

Signed at Johnson City, in the county of Broome, State of New York, this 28th day of February, 1920.

ANSEL C. DENNING.